United States Patent [19]

Tonelli

[11] Patent Number: 5,076,211
[45] Date of Patent: Dec. 31, 1991

[54] TEAT CUP CLAW
[75] Inventor: Guido Tonelli, Södertälje, Sweden
[73] Assignee: Alfa-Laval Agriculture International AB, Tumba, Sweden
[21] Appl. No.: 585,080
[22] PCT Filed: May 17, 1989
[86] PCT No.: PCT/SE89/00209
§ 371 Date: Oct. 11, 1990
§ 102(e) Date: Oct. 11, 1990
[87] PCT Pub. No.: WO89/10684
PCT Pub. Date: Nov. 16, 1989
[30] Foreign Application Priority Data
May 4, 1988 [SE] Sweden .................. 8801683
[51] Int. Cl.⁵ .................................. A01J 5/00
[52] U.S. Cl. ...................... 119/14.55; 119/14.54
[58] Field of Search ................. 119/14.54, 14.55
[56] References Cited
U.S. PATENT DOCUMENTS
1,348,401 8/1920 Frimand ............... 119/14.55
4,314,526 2/1982 Nordewskjold ............ 119/14.55
4,537,152 8/1985 Thompson ............... 119/14.54

FOREIGN PATENT DOCUMENTS
335811 6/1971 Sweden .

Primary Examiner—John G. Weiss
Attorney, Agent, or Firm—Hovey, Williams, Timmons & Collins

[57] ABSTRACT

A teat cup claw comprises a housing (1) forming a chamber (5), at least an inlet for supplying milk to the chamber, an outlet (7) for milk from the chamber for connection to a vacuum source, and a tube (8), which is arranged in the chamber with one of its ends connected to said milk outlet and with its other end situated in the vicinity of but spaced from the bottom of the chamber, the opening of the tube at said other end facing the botttom of the chamber. According to the invention, the part (10) of the tube (8), which during operation is passed by flow of milk from the chamber (5) into the tube (8) in the area of the opening of the tube at said other end, is formed of curved surface portions, having radii of curvature which are greater than 1.5 millimeters.

5 Claims, 1 Drawing Sheet

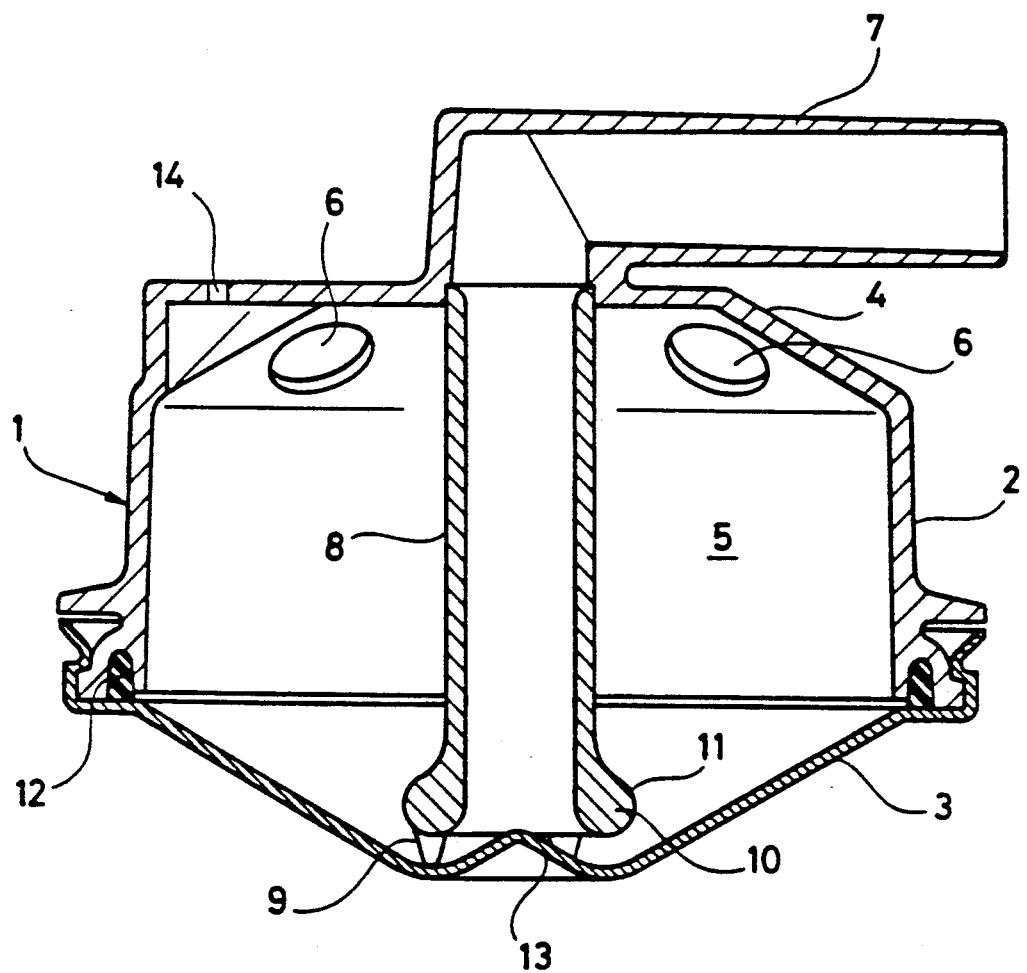

TEAT CUP CLAW

BACKGROUND OF THE INVENTION

1. Field of the Invention

The present invention relates to a teat cup claw having a housing with a side portion, a bottom portion and a roof portion, which form a chamber for receiving milk. At least one inlet is arranged in the roof portion of the housing for supplying milk to the chamber from the animal to be milked, and an outlet for milk from the chamber is arranged in the roof portion of the housing for connection to a source of vacuum. A tube is arranged in the chamber with one of its ends connected to said milk outlet and with its other end situated close to but spaced from the bottom of the chamber for conducting milk from the lower part of the chamber up to the milk outlet, the opening of the tube at said other end facing the bottom of the chamber.

2. Description of the Prior Art

A teat cup claw of this kind has the advantage that its milk outlet is protectively placed on the roof portion of the claw, in contrast to the kind of teat cup claw presently most used, which lacks said tube in the chamber and which therefore need to have its milk outlet arranged on a low level in the teat cup claw. This low unprotected placing of the milk outlet leads to a great risk of damaging the milk outlet. For instance, this may easily be damaged if the teat cup claw is dropped on a floor, which often can consist of hard concrete.

Another advantage of the teat cup claw of the kind here present is that the pulsation hoses of the milking machine, which normally are connected to the teat cups via a distribution device on the roof portion of the housing, can be placed close to the milk hose from the milk outlet, at the connection places of the hoses on the teat cup claw. Thus, the portions of the milk hose and the pulsation hoses, which are situated close to the teat cup claw, can be utilized as a handle when handling the teat cup claw with the teat cups connected to the latter. Besides, it is thereby substantially avoided that the teat cup claw because of tensions created by the milk hose, is tilted during operation, so that the milk level in the teat cup claw also is tilted relative to the claw, which often can happen in teat cup claws, which have low placed milk outlets. Such a tilting of the milk level can result in the risk of an infected teat infecting other teats during milking owing to infected milk collected in the teat cup claw being sucked backwards from the latter through a milk inlet to a healthy teat (so called cross-flow).

However, the teat cup claw of the kind here present has the serious drawback that milk passing through the latter often deteriorates considerably in quality regarding the taste of the milk. This deterioration in taste is due to the fact that some of the protein shells enclosing the balls of fat in the milk, will burst because of rough transportation of the milk through the teat cup claw, whereby bad tasting free fatty acids are created from the exposed milk fat.

EP 222 574 discloses a teat cup claw with a highly placed milk outlet, by means of which the above described problem with deterioration of the milk quality is solved by connecting the upper part of the chamber directly to a further vacuum source, which is responsible for the extraction of the milk from the teats and the transportation of milk to the teat cup claw. The vacuum source, which is connected to the milk outlet, thus is only responsible for the transportation of milk from the teat cup claw. Thus, air is substantially separated from milk in the chamber, so that the mixture of milk and air, which is sucked from the chamber up into the tube, contains a relatively small amount of air. This substantially removes unfavourable influences on the milk by the air during the turbulent streaming of the mixture of milk and air, when the latter flows from the chamber into the tube, so that at least most of the protecting protein shells surrounding the balls of fat will remain intact. However, a milking machine utilizing this known teat cup claw will be relatively complicated and expensive, for one thing because solely for transporting the milk it would be necessary to connect two separate vacuum sources to the teat cup claw.

SUMMARY OF THE INVENTION

The object of the present invention is to provide a simple and relatively inexpensive new teat cup claw of the kind here presented, which during operation will treat the milk carefully, so that the quality of the milk will not deteriorate during the passage of milk through the teat cup claw.

Thus, the invention hereof provides a teat cup claw of the kind initially mentioned, in which the tube defines a part over which milk flows in the area of the opening of the tube at said other end when milk passes from the chamber into the tube during operation. Said tube part is formed of curved surface portions having radii of curvature which are greater than 1.5 millimeters.

It has surprisingly been proved that without any preceding separation of air from the mixture of air and milk which is collected in the chamber, the number of burst protein shells is substantially reduced in the milk leaving the teat cup claw. Apparently, sharp edges on the tube in the area of the inlet opening of the tube create an unfavourable turbulence in the mixture of milk and air flowing into the tube, such that the protein shells of the balls of fat in the milk will burst. Thus, such sharp edges are primarily responsible for the deterioration of the milk quality, while the air content of the mixture of milk and air and the flow path of the mixture are of secondary significance.

Empirical tests have proved that the number of burst protein shells in the milk decreases with increasing radii of curvature of the surface portions of the tube at said part of the tube, which during operation is passed by flow of milk from the chamber into the tube. Therefore, said part of the tube is preferably formed of curved surface portions, having radii of curvature which are greater than 4 mm, which has proved to provide a good quality of extracted milk.

Suitably, said part of the tube comprises an annular end portion, which forms the opening of the tube, the surface of the annular end portion being curved between the inner side and the outer side of the tube perpendicular to the circumferential direction of the end portion.

If a thin wall tube is used the end portion may suitably be formed with a radial extension, which is larger than the radial extension of the part of the tube, which extends upwards from the end portion, so that this forms an outwardly directed bulge, the curved surface portions of which having necessary radii of curvature.

The tube may have any cross-section. However, a circular cross-section is preferred, which is advantageous from manufacturing point of view.

It should be understood that the above mentioned expression "curved surface portions" also includes successive relatively small plane surface portions, which form a substantially curved surface. For instance, the end portion of a tube may be formed by turning, so that a plurality of annular conical part surfaces form a substantially curved surface between the inner side and outer side of the tube.

BRIEF DESCRIPTION OF THE DRAWING

The FIGURE is a vertical cross-section through the teat cup claw in accordance with the present invention.

The teat cup claw shown in the drawing comprises a housing 1 with a side portion 2, a bottom portion 3 and a roof portion 4, which form a chamber 5. In the roof portion 4 there are four inlets 6 arranged for supplying milk to the chamber 5 from the respective four teats of the animal to be milked. An outlet 7 for milk from the chamber 5 is arranged in the roof portion 4 for connection to a source of vacuum. The roof portion 4 is also provided with a distribution device not [shown in the drawing] for connection of pulsation hoses between the teat cups, the teat cup claw and a pulsator. A straight tube 8 with a relatively thin wall of 3 mm and with a circular cross-section extends centrally and vertically in the chamber 5 and has its upper end connected to the milk outlet 7. The lower end of the tube 8 is kept in the vicinity of but spaced from the bottom of the chamber 5 by means of spacing members 9 formed on the tube, the opening of the tube 8 facing the bottom in vertical direction.

In the area of the opening of the tube 8 the tube is formed with a thickened end portion 10, which extends around the opening of the tube. The surface 11 of the end portion curves from the inside of the tube towards the outside of the tube seen in an axial section of the tube, along a part of an arc having a radius of 4 mm and curves further from this in the opposite direction of curvature along a bow to the outside of the tube, the last mentioned bow having radii of curvature being at least 4 mm. The inner diameter of the tube 8 is 16 mm, the outer diameter of the end portion 10 thus being 32 mm.

The bottom portion 3 is conically formed of an impact resistant material, for instance stainless steel, and is via an annular gasket 12 sealingly attached to the side portion 2 coaxially with the tube 8. The conical shape of the bottom portion 3 means the advantage that only a relatively small amount of milk is required in the chamber for the opening of the tube 8 to be below the free liquid surface, so that the teat cup claw will function in the intended manner. Centrally in the bottom portion 3, there is an upwards directed conical indentation 13 having its tip directed centrally up into the tube 8. The indentation 13 stiffens the bottom portion 3 and forms a favourable flow path from the chamber 5 into the tube 8 for the mixture of air and milk.

In the roof portion 4, there is a small passage 14 extending from the outside of the teat cup claw to the chamber 5. During operation air passes through the passage 14 into the chamber 5 and entrains the milk from the latter via the tube 8 out of the teat cup claw. This entrainment of the milk by means of air without running the risk of deteriorating the milk quality, thus is made possible because of the end portion 10 lacking sharp edges.

I claim:

1. A teat cup claw for a milking machine comprising:
    a housing presenting a side portion, a bottom portion and a roof portion and forming a chamber for receiving milk therein;
    at least one inlet arranged in the roof portion of the housing for supplying milk to the chamber from the animal to be milked;
    an outlet for the passage of milk from the chamber arranged in the roof portion of the housing for connection to a source of vacuum;
    a tube arranged in the chamber having two ends, one of the ends being connected to said milk outlet and the other end presenting an opening situated proximate to but spaced from the bottom portion for conducting milk from the lower part of the chamber up to the milk outlet,
    the opening of the tube at said other end facing the bottom portion, the tube defining a part in the area of the opening over which milk flows into the tube during operation,
    said tube part being formed of curved surface portions having radii of curvature which are greater than 1.5 millimeters.

2. A teat cup claw according to claim 1, wherein said tube part is formed of curved surface portions having radii of curvature which are greater than 4 millimeters.

3. A teat cup claw according to claim 1 or claim 2, wherein said tube part comprises an annular end portion, from which the tube extends into the chamber with an upwards directed part, the annular portion being formed with a radial extension which is larger than the radial extension of said upwards directed part of the tube.

4. A teat cup claw according to claim 3, wherein the radial extension of the tube at said other end is about twice the radial extension across the opening of the tube at said other end.

5. A teat cup claw according to claim 4, wherein the tube has a circular cross-section.

* * * * *